United States Patent
Binder et al.

(10) Patent No.: US 10,302,148 B2
(45) Date of Patent: May 28, 2019

(54) SWITCHING DEVICE FOR A MOTOR VEHICLE TRANSMISSION

(71) Applicant: HOERBIGER ANTRIEBSTECHNIK HOLDING GMBH, Schongau (DE)

(72) Inventors: Juergen Binder, Schongau (DE); Sami Oezkan, Murnau (DE); Peter Echtler, Schongau (DE); Andreas Dempfle, Eggenthal (DE); Philip Minkwitz, Polling (DE); Tobias Schuler, Altenstadt (DE); Christopher Traut, Untermeitingen (DE)

(73) Assignee: HOERBIGER ANTRIEBSTECHNIK HOLDING GMBH (DE)

( * ) Notice: Subject to any disclaimer, the term of this patent is extended or adjusted under 35 U.S.C. 154(b) by 9 days.

(21) Appl. No.: 15/593,127

(22) Filed: May 11, 2017

(65) Prior Publication Data
US 2017/0328420 A1    Nov. 16, 2017

(30) Foreign Application Priority Data
May 11, 2016   (DE) .................. 10 2016 108 701

(51) Int. Cl.
*F16D 25/0632* (2006.01)
*F16D 23/06* (2006.01)
(Continued)

(52) U.S. Cl.
CPC ............. *F16D 23/06* (2013.01); *F16D 13/32* (2013.01); *F16D 23/04* (2013.01);
(Continued)

(58) Field of Classification Search
CPC ...................... F16D 23/0681; F16D 13/32
See application file for complete search history.

(56) References Cited

U.S. PATENT DOCUMENTS

| 6,588,563 B1* | 7/2003 | Sarrach ................ F16D 23/025 |
| | | 192/53.34 |
| 2008/0132374 A1* | 6/2008 | Puiu ....................... B60K 6/365 |
| | | 475/269 |

FOREIGN PATENT DOCUMENTS

| DE | 19526684 | 1/1997 | ............... F16H 3/12 |
| DE | 19833397 | 2/2000 | ............. F16D 13/26 |

(Continued)

OTHER PUBLICATIONS

Office Action issued in corresponding German Application Serial No. DE102016108701 dated Jan. 18, 2017 with English Summary (6 pages).

*Primary Examiner* — Charles A Fox
*Assistant Examiner* — Ryan P Dodd
(74) *Attorney, Agent, or Firm* — Hayes Soloway P.C.

(57) ABSTRACT

A shifting device for a motor vehicle transmission has a first coupling component, a second coupling component rotatable about a transmission axis (A), an inner friction ring which has a conical surface on a radially outer face, an outer friction ring which has a conical surface on a radially inner face, and an intermediate friction ring having a C-shaped ring cross section, including a friction cone connected to the second coupling component for joint rotation with and for axial displacement with respect to the second coupling component, while the inner friction ring and the outer friction ring are connected to the first coupling component for joint rotation with and for axial displacement with respect to the first coupling component. The friction cone extends between the conical surfaces of the inner friction ring and outer friction ring.

22 Claims, 11 Drawing Sheets

(51) Int. Cl.

| | |
|---|---|
| *F16D 13/32* | (2006.01) |
| *F16D 23/04* | (2006.01) |
| *F16H 63/30* | (2006.01) |
| F16D 13/34 | (2006.01) |
| F16H 57/04 | (2010.01) |
| F16H 61/04 | (2006.01) |
| F16H 3/66 | (2006.01) |

(52) U.S. Cl.
CPC ......... *F16D 25/0632* (2013.01); *F16H 63/30* (2013.01); *F16H 63/3026* (2013.01); *F16D 13/34* (2013.01); *F16D 2023/0681* (2013.01); *F16D 2023/0693* (2013.01); *F16D 2300/0214* (2013.01); *F16D 2300/06* (2013.01); *F16H 3/66* (2013.01); *F16H 57/0432* (2013.01); *F16H 57/0473* (2013.01); *F16H 61/0403* (2013.01); *F16H 2063/3093* (2013.01); *F16H 2200/0065* (2013.01); *F16H 2200/2012* (2013.01); *F16H 2200/2046* (2013.01); *F16H 2200/2064* (2013.01); *F16H 2200/2094* (2013.01)

(56) References Cited

FOREIGN PATENT DOCUMENTS

| | | | | |
|---|---|---|---|---|
| DE | 102014103172 | | 9/2015 | ............. F16D 23/06 |
| DE | 102014108202 | | 12/2015 | ............. F16D 23/06 |
| DE | 102014117194 | | 5/2016 | ............. F16D 23/06 |
| FR | 2821652 | | 9/2002 | ............. F16D 23/04 |
| GB | 1125946 | A * | 9/1968 | ............. F16D 23/06 |
| WO | WO-2007028912 | A2 * | 3/2007 | ............. F16D 13/34 |

* cited by examiner

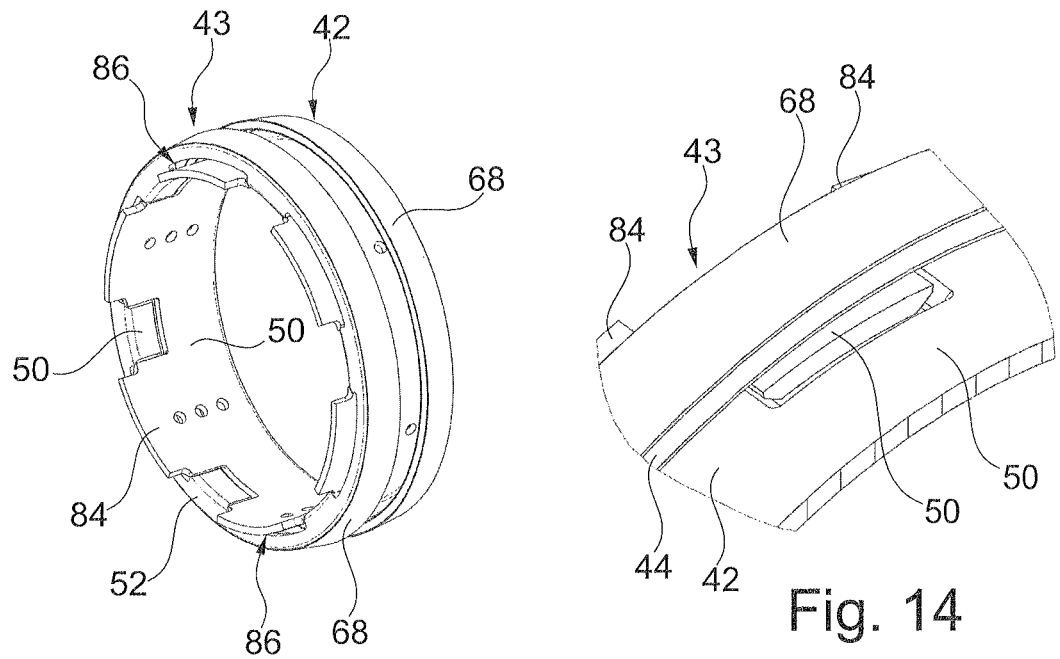
Fig. 13
Fig. 14
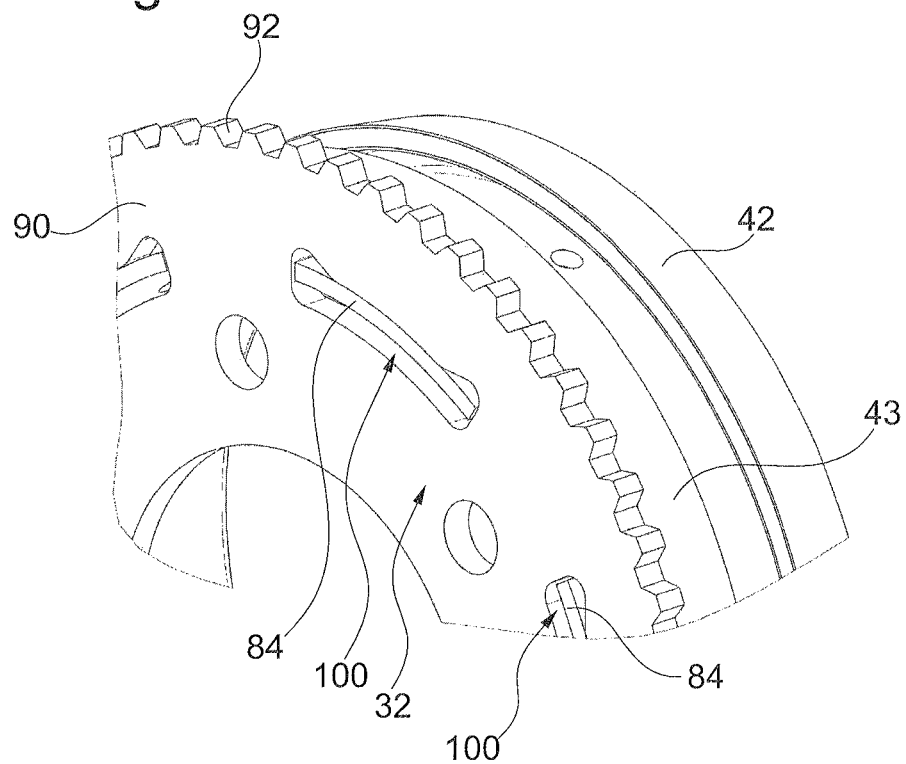
Fig. 15

SWITCHING DEVICE FOR A MOTOR VEHICLE TRANSMISSION

FIELD OF THE INVENTION

The invention relates to a shifting device for a motor vehicle transmission, in particular for a fully automatic stepped transmission

BACKGROUND

Shifting devices of this type for motor vehicles are already known from the generic DE 198 33 397 A1, and are used for example in automatic transmissions of a planetary and spur gear construction. The shifting devices replace for example conventional lamellar couplings, and this has an advantageous effect on the weight and the required installation space for the motor vehicle transmission.

Further, the cone angle between the conical surfaces and the transmission axis results in a force amplification, in such a way that the shifting force required for the frictional fit is reduced by comparison with the shifting force required in a lamellar coupling.

In other words, in the above-disclosed shifting device, for transmitting comparable torques, fewer friction surfaces are required than in the lamellar couplings conventionally used in automatic transmission, and so the power losses due to drag torques are advantageously reduced.

In particular at high transmission rotational speeds, however, it has been found that the drag torques do not fall off to the expected extent, but still lead to undesirably large power losses in the motor vehicle transmission.

Therefore, the object of the invention is to provide a particularly light and compact shifting device for motor vehicle transmissions, which only has low power losses from drag torques even at high rotational speeds.

SUMMARY

The present invention provides a shifting device comprising a first coupling component, a second coupling component rotatable about a transmission axis, an inner friction ring which has a conical surface on a radial outer face and is connected to the first coupling component for joint rotation with and for axial displacement with respect to the first coupling component, an outer friction ring which has a conical surface on a radial inner face and is connected to the first coupling component for joint rotation with and for axial displacement with respect to the first coupling component, and an intermediate friction ring which comprises a friction cone and is connected to the second coupling component for joint rotation with and for axial displacement with respect to the second coupling component, the friction cone extending between the conical surface of the inner friction ring and the conical surface of the outer friction ring, the first coupling component and the second coupling component being decoupled in the rotation direction in an axial starting position of the outer friction ring and being coupled in a frictional fit in the rotation direction in an axial frictional fit position of the outer friction ring. The intermediate friction ring has a C-shaped ring cross section extending peripherally in the circumferential direction, comprising a radially outer linear cone limb which forms the friction cone and comprises two substantially parallel conical friction surfaces, and comprising a radial inner linear axial limb which is integrally connected to the cone limb by a radial web.

The peripherally C-shaped cross section of the intermediate friction ring comprising a radial inner linear axial limb results in particularly exact axial guidance of the intermediate friction ring on the second coupling component.

The invention is based on the finding that the connection of the intermediate friction ring to the second coupling component according to DE 198 33 397 leads to undesirable "wobbling" of the intermediate friction ring as a result of insufficient axial guidance, in particular at high transmission rotational speeds. This wobbling movement of the intermediate friction ring results in drag torques and accompanying power losses of the motor vehicle transmission.

Post-published DE 10 2014 117 194 A1 likewise discloses a generic shifting device. Analogously to DE 198 33 397 A1, however, this patent application does not disclose an intermediate ring which has a C-shaped ring cross section extending peripherally in the circumferential direction, comprising a radially external linear cone limb. Instead of the linear axial limb, an angled limb comprising an axial portion and a radial portion is provided on the radially inner face of the intermediate friction ring, the radial portion having radially inwardly protruding projections or teeth for rotationally engaged and axially displaceable connection to the second coupling component.

By contrast, the intermediate friction ring of the shifting device according to the invention is defined in the radial direction by a radial inner face of the axial limb. In other words, the axial limb thus extends linearly from the radial web of the intermediate friction ring in the axial direction to a free axial end, at which in particular no radially inwardly protruding projections are provided.

In an embodiment of the shifting device, the first coupling component is a transmission housing or an actuation sleeve connected to the transmission housing for joint rotation with and for axial displacement with respect to the transmission housing. The shifting device thus acts as a brake which can brake the rotatable second coupling component and lock it rotationally engaged on the housing.

In an alternative embodiment, the first coupling component is a transmission shaft or a transmission shaft element rigidly connected to the transmission shaft. In this case the two coupling components experience rotational speed equalisation as a result of the shifting, and are in particular coaxially orientated and assigned to different planetary gear sets of the motor vehicle transmission.

The inner friction ring and/or the outer friction ring of the shifting device are preferably reshaped sheet metal parts.

Further, the intermediate friction ring may also be a sheet metal part reshaped to obtain a C-shape in cross section. Producing as many components of the shifting device as possible from sheet metal leads to a reduced complexity of manufacture, a lower weight and a particularly compact construction of the shifting device by comparison with sintered components.

In an embodiment of the shifting device, the axial limb of the intermediate friction ring comprises an internal toothing on the radial inner side, which extends over the entire axial length of the axial limb. An internal toothing of this type ensures exact axial guidance of the intermediate friction ring on the second coupling component, in such a way that undesirable wobbling of the intermediate friction ring is reliably prevented even at high transmission rotational speeds.

In this embodiment, the second coupling component is preferably a shifting shaft which has an external toothing engaged with the internal toothing of the intermediate friction ring. The second coupling component and the intermediate friction ring thus have an axially elongate toothing engagement, which also ensures a particularly high torque transmission capacity of the connection, as well as largely play-free axial guidance.

In addition, a spring element may be provided which urges the inner friction ring and the outer friction ring axially into a ventilation position. As a result of the spring element, there is no decoupling between the outer and the inner ring. The two components are still coupled to the coupling component in the rotational direction via the outer toothings thereof. The purpose of the spring element is to implement ventilation play as a result of the axial spacing of the outer and inner ring, meaning that the intermediate ring can (more easily) be decoupled in the rotational direction.

In an embodiment of the shifting device, the inner friction ring, the outer friction ring and the intermediate friction ring form a first friction ring set, a second friction ring set being provided which comprises a further inner friction ring, a further outer friction ring and a further intermediate friction ring. As a result of the use of a plurality of friction ring sets, the number of friction contacts can be increased at a low constructional complexity, increasing the torque transmission capacity between the coupling components.

Preferably, in this embodiment the first friction ring set and the second friction ring set are arranged mirror-symmetrically, the transmission axis extending perpendicular to a plane of symmetry of the friction ring sets. If the coupling components are to transmit particularly high torques, it is naturally also conceivable for more than two friction ring sets to be provided, two mutually axially adjacent friction ring sets each being arranged mirror-symmetrically. As a result of the mirror-symmetrical configuration of the friction ring sets, no constructionally altered components are required so as to increase the torque transmission capacity, since all friction ring sets have identically constructed components.

Preferably, in this embodiment the inner friction ring and the further inner friction ring of the shifting device are each formed peripherally L-shaped in cross section and each comprise a cone limb and a radial limb extending radially outwards from the cone limb.

The radial limbs may be axially braced against one another in such a way that the inner friction ring and the further inner friction ring form an inner lamella peripherally T-shaped in cross section. In particular, the radial limbs of the two inner friction rings are interconnected in such a way that the guidance length for the first coupling component increases and more exact guidance of the inner friction ring in the axial direction is provided. Undesirable wobbling movements of the inner friction rings, in particular at high transmission rotational speeds, are reduced or even completely prevented by this improved axial guidance. Alternatively, it is also conceivable for the inner friction ring and the further inner friction ring to be formed integrally. However, the resulting advantage of a lower number of individual components is counteracted by the drawback that with the T-shaped inner lamella a new component is required, and friction ring sets having identical components cannot simply be lined up.

If the inner friction ring and the further inner friction ring are configured separately, the radial limbs thereof are preferably in surface contact with one another, the second coupling part being a hollow, perforated shifting shaft for internally oiling the friction surfaces.

Alternatively, at least one of the radial limbs may comprise spacers, spaced apart in the circumferential direction, for axially spacing apart the inner friction rings, the first coupling component comprising a duct, for externally oiling the friction surfaces, radially outside the spacers.

In a further embodiment of the shifting device, the radially inner axial limb of the intermediate friction ring comprises limb projections spaced apart in the circumferential direction, which extend in the axial direction and engage in recesses of the further intermediate friction ring and of the second coupling component in an exact fit in the circumferential direction. This results, at a low constructional complexity, in substantially rotationally engaged coupling of the two intermediate friction rings and the second coupling component via a claw connection.

In a further embodiment of the shifting device, the first coupling component is an axially displaceable actuation sleeve comprising an inner toothing and the second coupling component is a coupling disc comprising an outer toothing, the coupling components being decoupled in the rotational direction in an axial starting position of the first coupling component, being coupled in a frictional fit in the rotational direction in a frictional fit position of the first coupling component, and being coupled in a positive fit in the rotational direction via the inner toothing and the outer toothing in a positive fit position of the first coupling component. This embodiment is advantageous in particular if the shifting device is also to be configured for transmitting particularly large torques. In this embodiment, the holding forces and shifting forces for maintaining the torque transmission can be reduced considerably. It merely has to be ensured that the coupling toothings are not separated from one another in the connected state. Thus, by comparison with the frictional fit configuration, the transmission of the torque is independent of the level of the applied shifting force. Low to average torques can thus be transmitted for example via the frictional fit coupling whilst large torques are transmitted via the positive fit coupling. As an alternative to the positive fit coupling, it would also be conceivable to connect a plurality of friction ring sets in series so as to achieve the required torque transmission capacity. However, this would involve considerably complexity, a large installation space requirement, and an undesirably high weight of the shifting device.

Preferably, in this embodiment a spring element is provided for axially coupling the actuation sleeve to the outer friction ring, the spring element entraining the outer friction ring when the actuation sleeve is displaced from the starting position towards the positive fit position in a relaxed state of the spring element, and being axially decoupled from the actuation sleeve in a tensioned state of the spring element. Thus, in this case, the first coupling component moves into the frictional fit position thereof or the positive fit position thereof in a power-controlled manner by way of an axial shifting force applied to the actuation sleeve.

In a further embodiment of the shifting device, a positive fit ring is provided, which is connected to the first coupling component for joint rotation with and for axial displacement with respect to the first coupling component, and has a claw toothing, the second coupling component being a coupling disc having a claw toothing, the coupling components being decoupled in the rotational direction in an axial starting position of the outer friction ring, being coupled in a frictional fit in the rotational direction in an axial frictional fit position of the outer friction ring, and being coupled in a positive fit in the rotational direction via the claw toothings in an axial positive fit position of the outer friction ring, an actuator unit being provided which in a blocking position blocks an axial movement of the outer friction ring from the frictional fit position into the positive fit position and in a release position releases an axial movement of the outer friction ring from the frictional fit position into the positive fit position. In this case, outer friction ring moves into the frictional fit position thereof or the positive fit position thereof independently of the actuator unit, which may for example be hydraulically actuated, and not in a power-controlled manner by way of an axial shifting force.

BRIEF DESCRIPTION OF THE DRAWINGS

FIG. 13 is a perspective view of two intercoupled intermediate friction rings of the shifting device of FIGS. 11 and 12;

FIG. 14 is a perspective detail view of the coupled intermediate friction rings of FIG. 13 in a coupling region;

FIG. 15 is a perspective detail view of the coupled intermediate friction rings of FIG. 13 and of a coupling component of the shifting device according to FIGS. 11 and 12;

DETAILED DESCRIPTION

Figure 1:
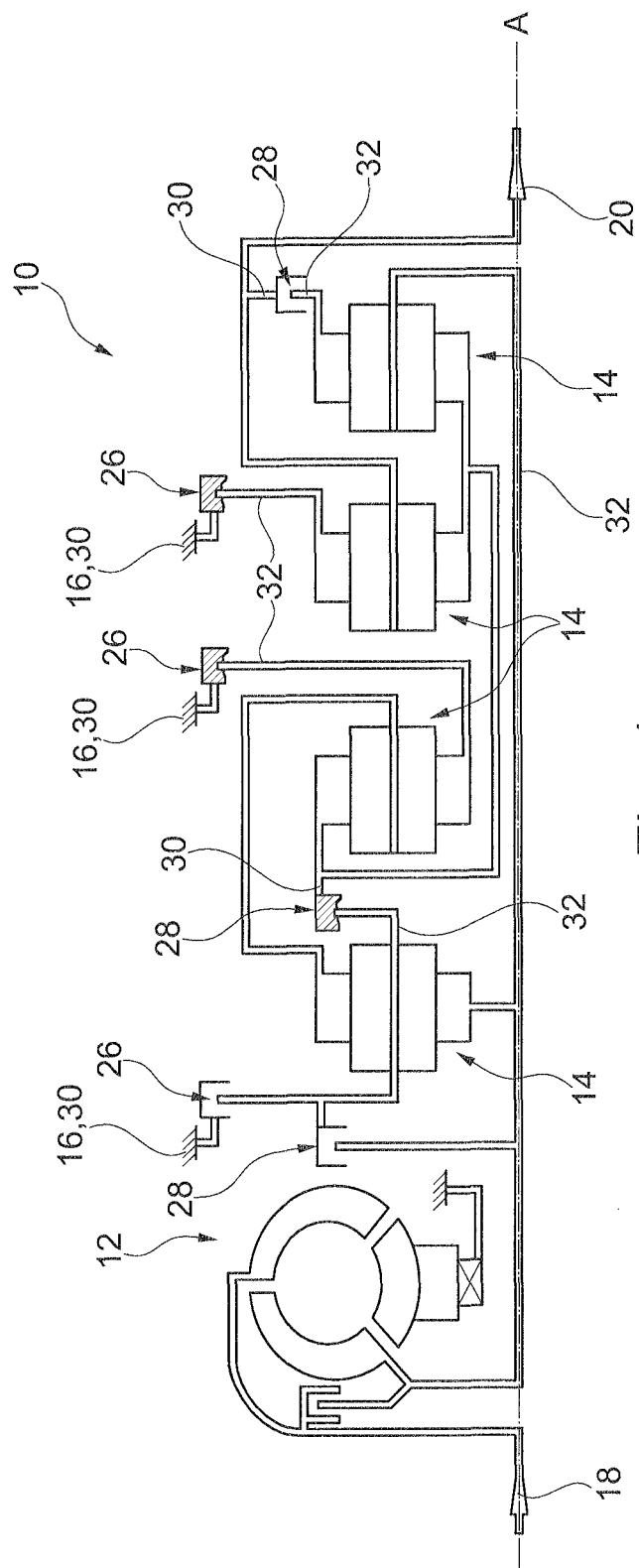
FIG. 1 is a transmission diagram of a fully automatic stepped transmission comprising a shifting device according to the invention.

FIG. 1 shows an electrohydraulically actuated, fully automatic stepped transmission 10 of a motor vehicle comprising a torque converter 12, four planetary transmissions or planetary gear sets 14 and a schematically indicated transmission housing 16. Further, a drive shaft 18, a driven shaft 20 and a plurality of transmission shafts are provided, planet carriers also being referred to as transmission shafts in the following. The transmission shafts are assigned to the individual planetary gear sets 14 and arranged mutually coaxial.

The stepped transmission 10 further comprises shifting devices 26, 28, which can be exerted to a hydraulic pressure and can couple a transmission shaft either to a further transmission shaft or to the transmission housing 16 or decouple the transmission shaft from the further transmission shaft or the transmission housing 16.

A shifting device 26 which couples the transmission shaft to the transmission housing 16 is also referred to as a braking device, and a shifting device 28 which intercouples two transmission shafts is also referred to as a coupling device. In the present embodiment, six shifting devices 26, 28 are provided, of which three shifting devices 26 are formed as braking devices and three shifting devices 28 are formed as coupling devices. For example, in FIG. 1 two braking devices and one coupling device are in the coupled state (shown shaded) and one braking device and two coupling devices are shown in the decoupled state.

Various shifting combinations of the shifting device 26, 28 thus result in transmission ratios between the drive shaft 18 and the driven shaft 20 which correspond to the individual gear ratios of the stepped transmission 10.

Since the general construction and mode of operation of fully automatic stepped transmissions 10 are already generally known from the prior art, these are not discussed in greater detail, and in the following merely the construction and functionality of the shifting devices 26, 28 according to the invention are described in detail.

Figure 2:
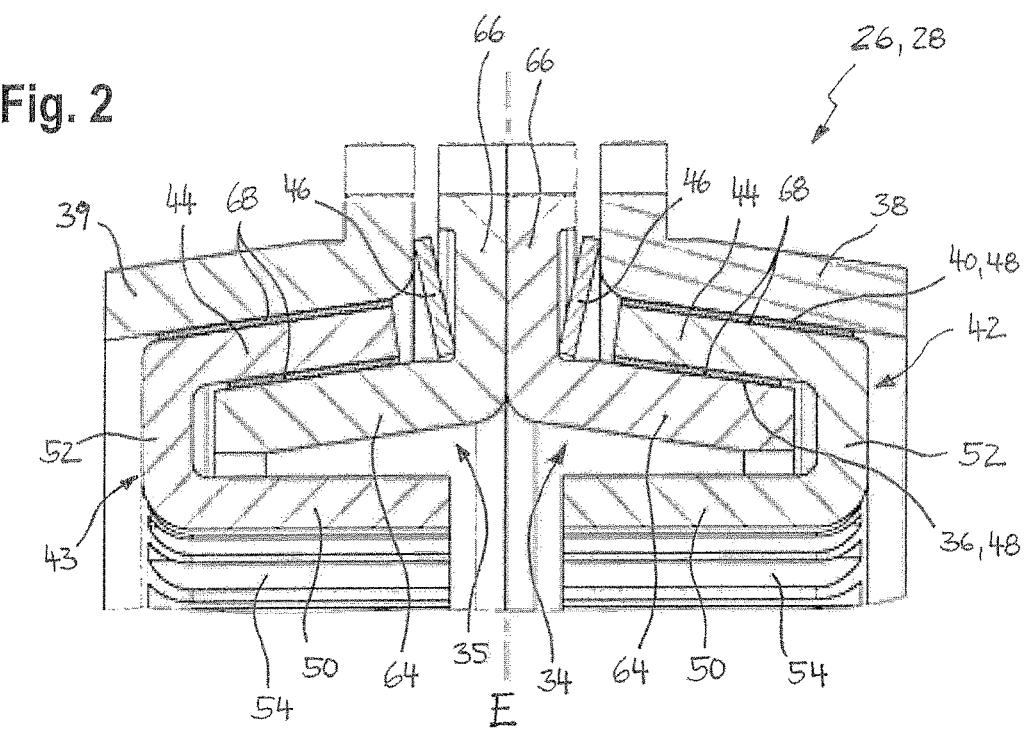
FIG. 2 is a longitudinal sectional detail of two friction ring sets of the shifting device according to the invention in accordance with an embodiment.
Figure 3:
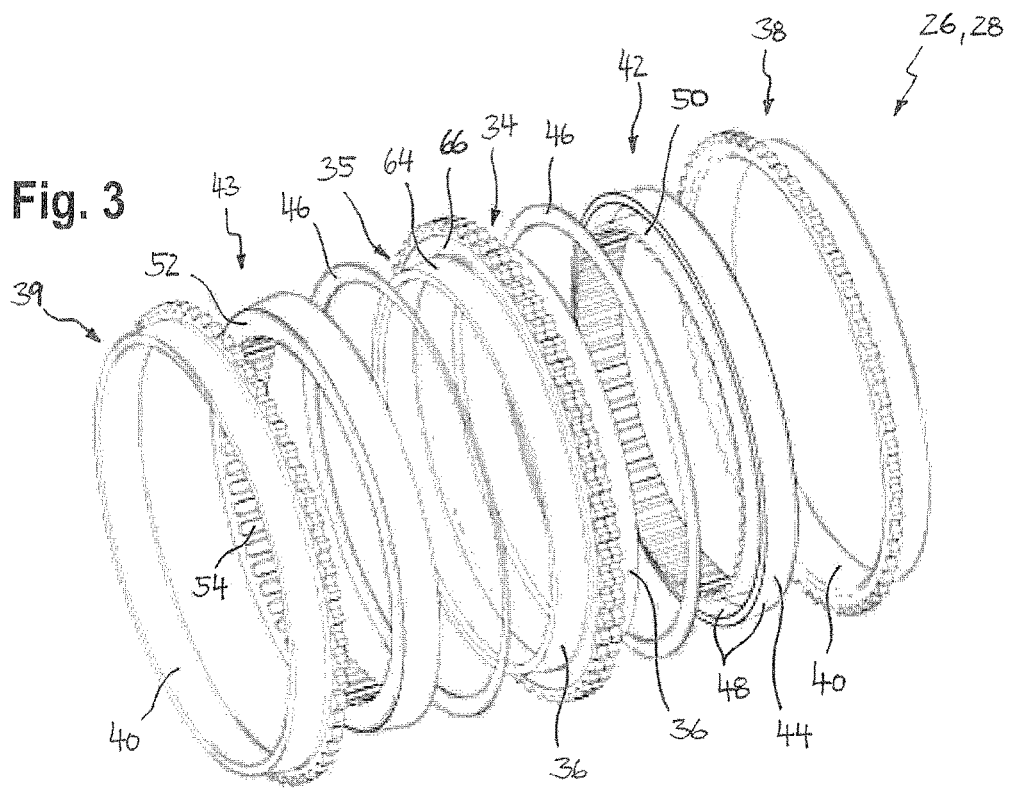
FIG. 3 is a perspective exploded view of the friction ring sets of FIG. 2.
Figure 4:
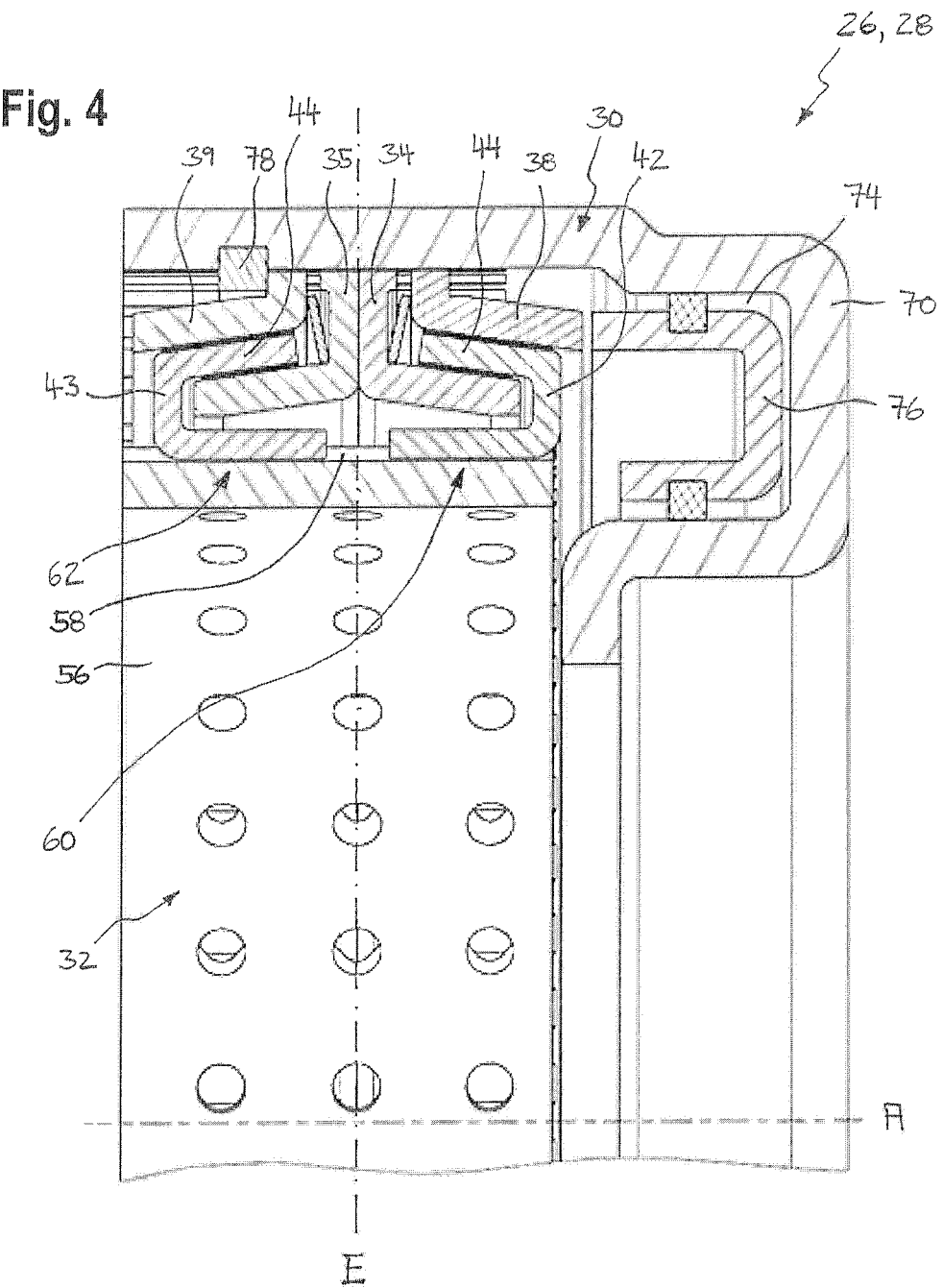
FIG. 4 is a longitudinal sectional detail of the shifting device according to the invention having the friction ring sets according to FIGS. 2 and 3.

FIG. 2 to 4 show an embodiment of the shifting device 26, 28 for a motor vehicle transmission, in particular for a fully automatic stepped transmission 10, comprising a first coupling component 30 (see FIG. 4), a second coupling component 32 rotatable about a transmission axis A, an inner friction ring 34 which has a conical surface 36 on a radial outer face and which is connected to the first coupling component 30 for joint rotation with and for axial displacement with respect to the first coupling component 30 via mutually engaging toothings, an outer friction ring 38 which has a conical surface 40 on a radial inner face and which is connected to the first coupling component 30 for joint rotation with and for axial displacement with respect to the first coupling component 30 via mutually engaging toothings, and an intermediate friction ring 42 which comprises a friction cone and is connected to the second coupling component 32 for joint rotation with and for axial displacement with respect to the second coupling component 32.

The friction cone 44 extends between the conical surface 36 of the inner friction ring 34 and the conical surface 40 of the outer friction ring 38, the first coupling component 30 and the second coupling component 32 being decoupled in the rotation direction in an axial starting position of the outer friction ring 38 and being coupled in a frictional fit in the rotation direction in an axial frictional fit position of the outer friction ring 38.

In the embodiment shown, the inner friction ring 34 and the outer friction ring 38 are reshaped sheet metal parts which can be produced at a low complexity of manufacture and which each have ring cross section peripherally a L-shaped in cross section. Between the inner friction ring 34, specifically a radially outwardly protruding limb of the inner friction ring 34, and the outer friction ring 38, specifically a radially outwardly protruding limb of the outer friction ring 38, a spring element 46 formed as a plate spring is provided, and urges the inner friction ring 34 and the outer friction ring 38 axially away from one another so as to bring about ventilation play. Thus, the ventilation position of the outer friction ring 38 also corresponds to the axial starting position thereof in the unactuated state of the shifting device 28.

The intermediate friction ring 42 is a sheet metal part shaped in a C shape, and thus has a C-shaped peripheral cross section peripherally in the circumferential direction. The C-shaped ring cross section comprises a radially outer linear cone limb, which forms the friction cone 44 and comprises two substantially parallel conical friction surfaces 48, and a radially inner linear axial limb 50, which is integrally connected to the cone limb by a radial web 52.

According to FIGS. 2 and 3, the axial limb 50 of the intermediate friction ring 42 comprises an internal toothing 54 on a radial inner side, which extends over the entire axial length of the axial limb 50.

According to FIG. 4, the second coupling component 32 is a shifting shaft 56, which may also be referred to as a transmission shaft, the shifting shaft 56 comprising an external toothing 58 engaged with the internal toothing 54 of the intermediate ring 42.

The large axial dimension of the toothing engagement results in exact and largely play-free axial guidance of the intermediate friction ring 42 relative to the second coupling component 32. This prevents or at least greatly reduces undesirable wobbling movement of the intermediate friction ring 42. Further, the internal toothing 54 and the external toothing 58 form comparatively large contact surfaces, in such a way that the torque-proof connection has a particularly high torque transmission capacity.

According to FIG. 2, the inner friction ring 34, the outer friction ring 38 and the intermediate friction ring 42 form a first friction ring set 60, a second friction ring set 62 being provided which comprises a further inner friction ring 35, a further outer friction ring 39 and a further intermediate friction ring 43. In this case, the first friction ring set 60 and the second friction ring set 62 are formed mirror-symmetrically, the transmission axis A extending perpendicular to a plane of symmetry E of the friction ring sets 60, 62.

In this case the friction ring sets 60, 62 are composed of identically constructed components, resulting in simple assembly with few different individual components.

In the embodiments of FIG. 2 to 17, the shifting devices 26, 28 each have two friction ring sets 60, 62, it also being possible for merely one friction ring set 60, 62 (see FIGS. 18 and 19) or more than two friction ring sets 60, 62 to be provided, depending on a desired torque capacity of the frictional fit connection between the coupling components 30, 32. If there are more than two friction ring sets 60, 62, two axially mutually adjacent friction rings sets are arranged mirror-symmetrically in each case.

In FIGS. 2 and 4, the inner friction ring 34 and the further inner friction ring 35 are each configured peripherally L-shaped in cross section, and each have a cone limb 64 and a radial limb 66 extending radially outwards from the cone limb 64. The radial limbs 66 are axially braced against one another, in such a way that the inner friction ring 34 and the further inner frictional ring 35 form an inner lamella peripherally T-shaped in cross section. In particular, the radial limbs 66 may be interconnected, resulting in improved axial guidance of the inner friction rings 34, 35 relative to the first coupling component 30 and preventing or at least reducing an undesirable wobbling movement of the inner friction rings 34, 35.

In the embodiment of FIG. 2 to 4, the radial limbs 66 are in surface contact with one another, in such a way that no significant flow of oil in the radial direction is possible between the radial limbs 66. In FIG. 4, the second coupling component 32, configured as a shifting shaft 56, is in particular a hollow, perforated shifting shaft 56 for internally oiling the friction surfaces 48.

Transmission oil for cooling the shifting device 26, 28 is provided "from the inside" via an axial through-duct in the hollow shifting shaft 56, and subsequently guided between the friction ring sets 60, 62 via the perforation in the shifting shaft 56. The transmission oil is pressed radially outwards, and has to make its way via the friction surfaces 48, since the radial limbs 66 of the inner friction rings 34, 35, which are in surface contact with one another, largely prevent a flow of oil radially outwards.

As is indicated in FIG. 2, the friction cone 44 of the intermediate friction rings 42, 43 is coated with a friction covering 68 on both sides, the friction covering 68 in each case forming a conical friction surface 48 for establishing frictional contact with a cone surface 36, 40 of the inner friction rings 34, 35 or the outer friction rings 38, 39. The friction coverings 68 may, in a known manner, comprise suitable grooves so as to facilitate the flow of oil.

In the embodiment of FIG. 2 to 4, the first coupling component 30 is a transmission shaft 70 (different from the shifting shaft 56). Accordingly, the shown shifting device 28 is specifically a coupling device.

Alternatively, it is also conceivable for the first coupling component 30 to be a transmission housing 16 or an axially displaceable actuation sleeve 72 rotationally engaged with the transmission housing 16. In this case, the shifting device 26 would specifically be a braking device.

In FIG. 4, a pressure chamber 74 comprising an axially displaceable piston 76 for axially urging the outer friction ring 38 is provided in the first coupling component 30.

Without the piston 76 being exerted to pressure, the outer friction ring 38 is urged into the axial starting position thereof, in which the coupling components 30, 32 are decoupled, by the spring elements 46. When the pressure chamber 74 and thus the piston 76 are exerted to pressure, the friction ring sets 60, 62 are pressed against an axial stop 78 against a spring force of the spring elements 46, the friction rings 34, 38, 42 and the further friction rings 35, 39, 43 forming friction contacts.

Finally, the outer friction ring 38 achieves its friction fit position in which the conical surfaces 36, 40 of the inner friction ring 34 and outer friction ring 38 are in contact with the conical friction surfaces 48 of the intermediate friction ring 42, in such a way that the coupling components 30, 32 are coupled in a frictional fit.

Further embodiments of the shifting device 26, 28 are disclosed in the following with reference to FIG. 5 to 19, but largely correspond to the embodiment described above in terms of the general construction principle and the general mode of operation. Therefore, reference is hereby explicitly made to the description of FIG. 2 to 4, and mainly the differences are discussed in the following.

Figure 5:
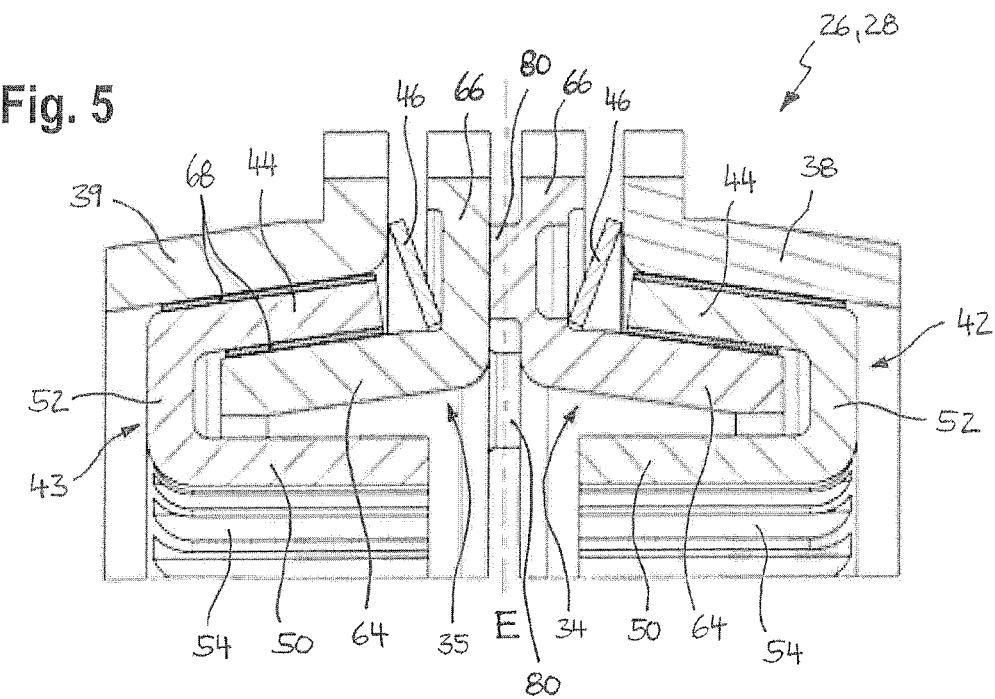
FIG. 5 is a longitudinal sectional detail of two friction ring sets of the shifting device according to the invention in accordance with a further embodiment.
Figure 6:
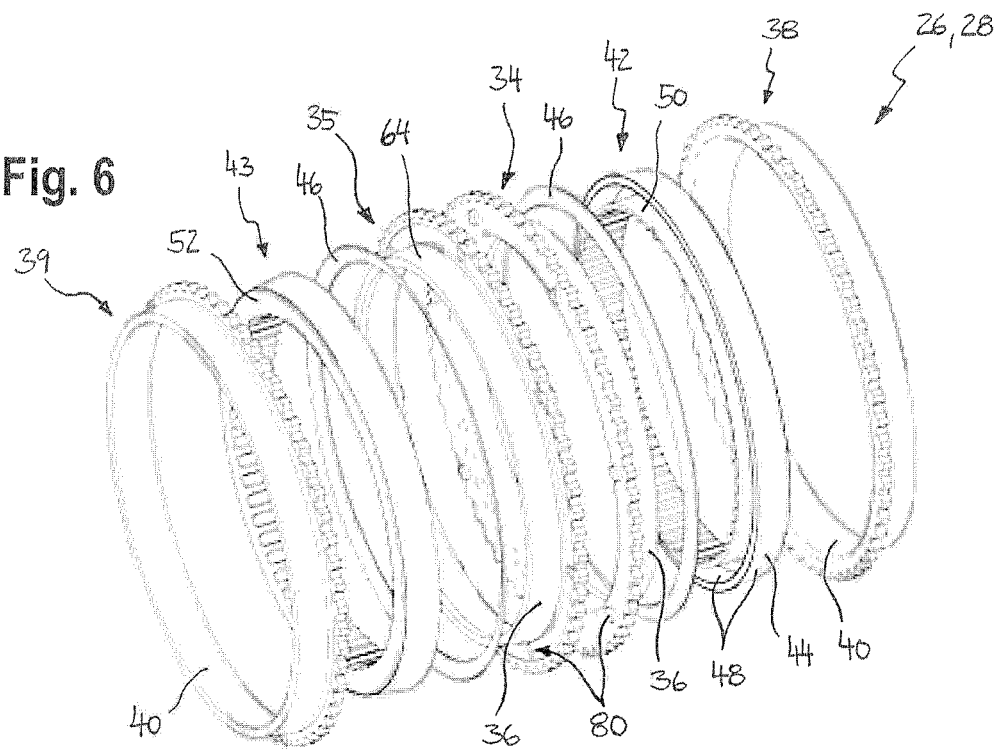
FIG. 6 is a perspective exploded view of the friction ring sets according to FIG. 5.
Figure 7:
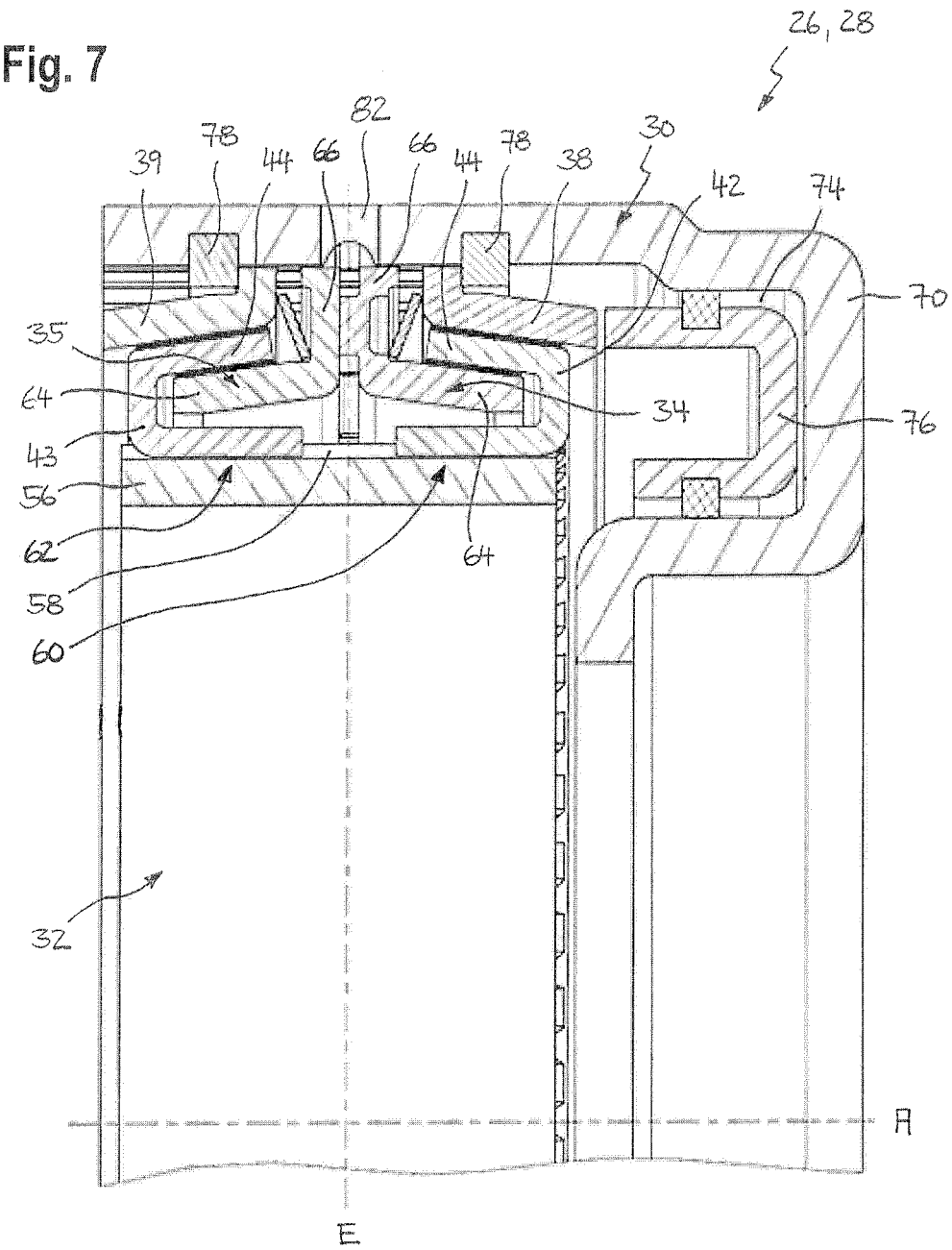
FIG. 7 is a longitudinal sectional detail of the shifting device according to the invention comprising the friction ring sets according to FIGS. 5 and 6.

FIG. 5 to 7 show an embodiment of the shifting device 26, 28 which merely differs from the embodiment of FIG. 2 to 4 in that the radial limbs 66 of the inner friction rings 34, 35 comprise spacers 80 for axially spacing the inner friction rings 34, 35.

In FIGS. 5 and 6, the spacers 80 are formed integrally with the radial limbs 66 and formed integrally on the inner friction rings 34, 35 for example by reshaping, in particular embossing. Further, the spacers 80 of the radial limbs 66 are spaced apart in the circumferential direction, in such a way that a radial flow of oil between the inner friction rings 34, 35 is possible.

In FIG. 7, the first coupling component 30 comprises a duct 82, for externally oiling the friction surfaces 48, radially outside the spacer 80 in this embodiment of the shifting device 26, 28.

Transmission oil for cooling the shifting device 26, 28 is pressed radially inwards between the radial limbs 66 via the duct 82, before flowing around the cone limb 64 of the inner friction rings 34, 35 and flowing radially outwards again in a wavy line shape via the friction surfaces 48.

Figure 8:
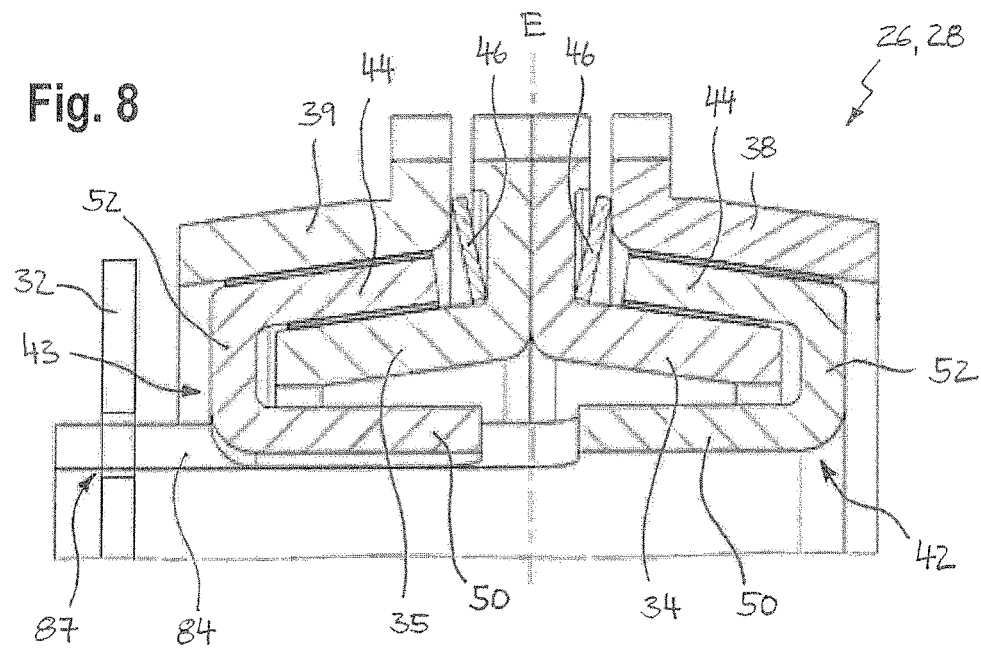
FIG. 8 is a longitudinal sectional detail of two friction ring sets of the shifting device according to the invention in accordance with a further embodiment.
Figure 9:
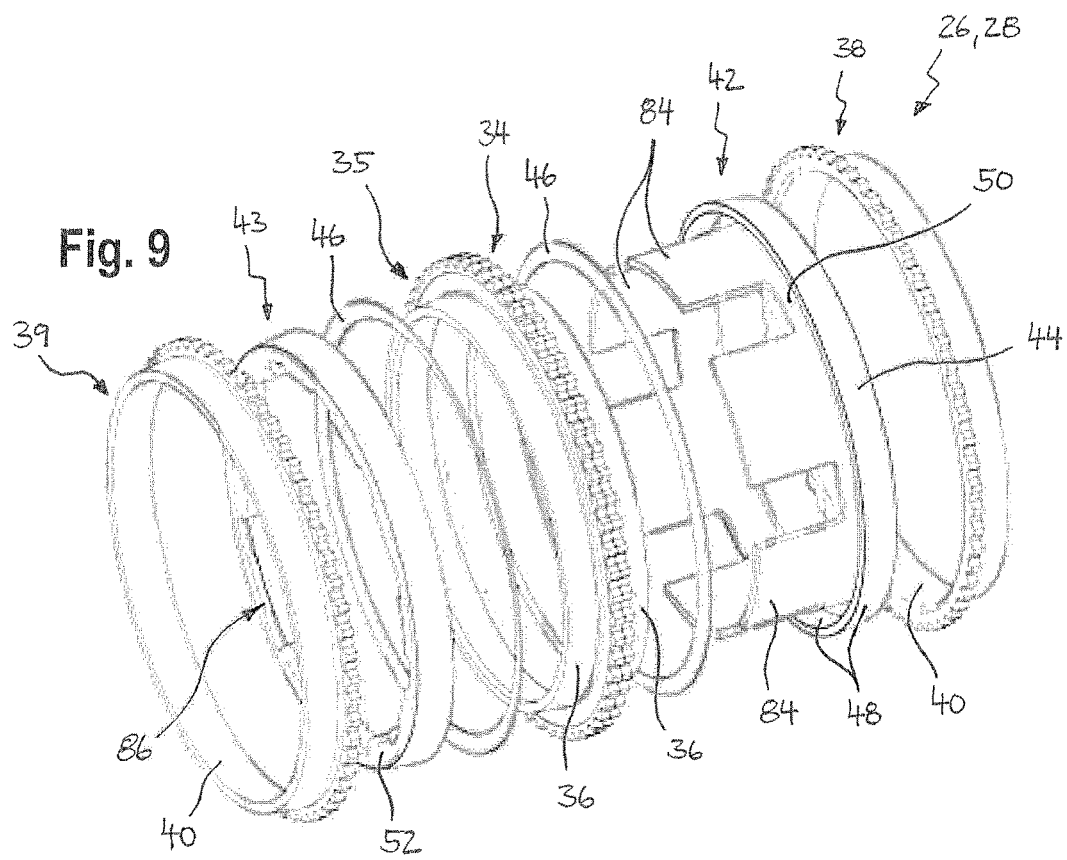
FIG. 9 is a perspective exploded view of the friction ring sets of FIG. 8.
Figure 10:
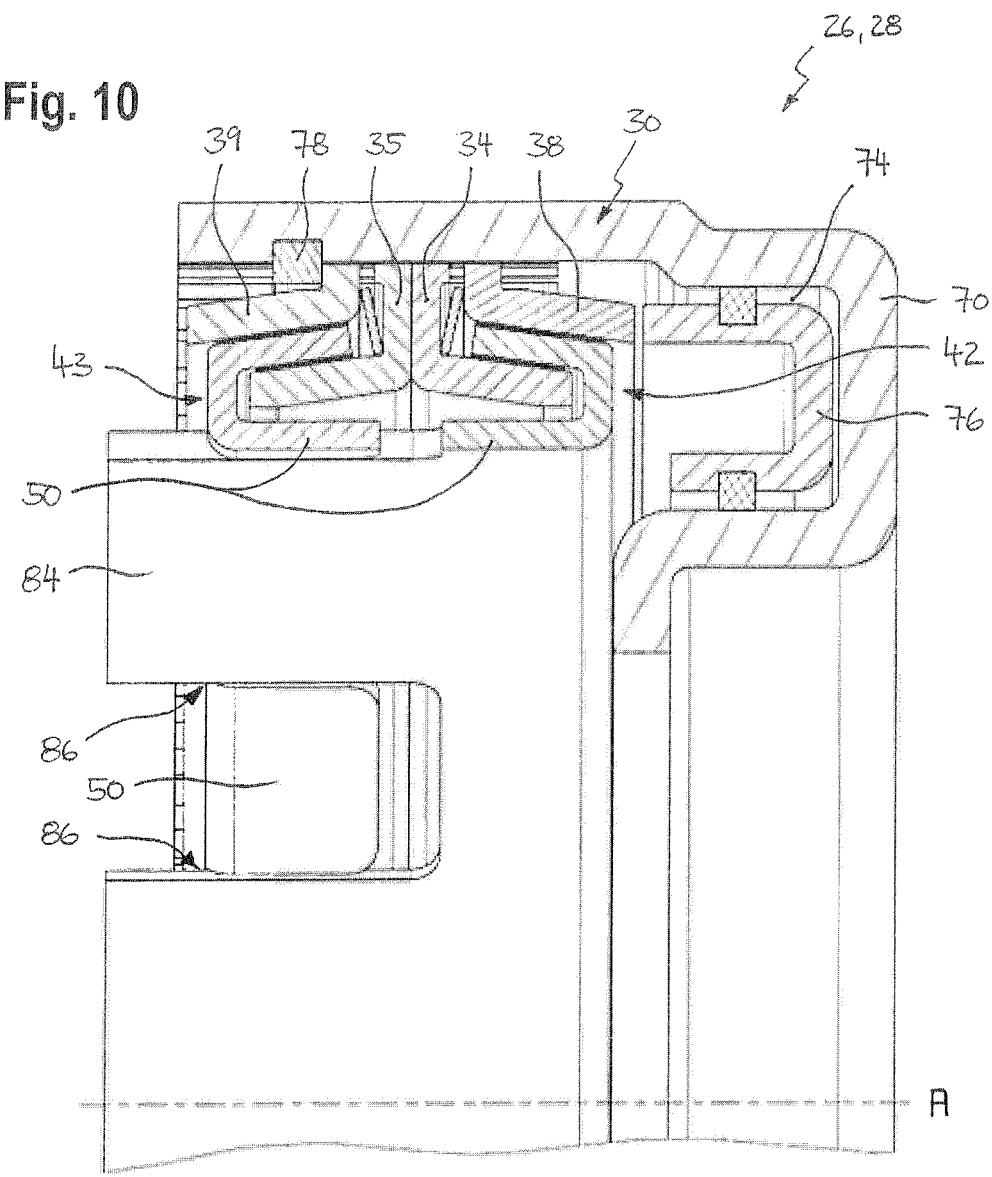
FIG. 10 is a longitudinal sectional detail of the shifting device according to the invention comprising the friction ring sets of FIGS. 8 and 9.

FIG. 8 to 10 show an embodiment of the shifting device 26, 28 which merely differs from the embodiment of FIG. 2 to 4 in that the intermediate friction rings 42, 43 of the two friction ring sets 60, 62 are directly intercoupled in the circumferential direction, and not indirectly via the externally toothed shifting shaft 56 of FIGS. 4 and 7.

Specifically, the radially inner axial limb 50 of the intermediate friction ring 42 comprises limb projections 84 spaced apart in the circumferential direction, which extend in the axial direction and engage in recesses 86 of the further intermediate friction ring 43 and a recess 87 of the second coupling component 32 in an exact fit in the circumferential direction. The recesses 86 in the further intermediate friction ring 43 are formed by interruptions in the axial limb 50, in such a way that the limb projections 84 extend in an exact fit between the remaining axial limb portions of the further intermediate friction ring 43.

This results in rotationally engaged coupling of the two intermediate friction rings 42, 43 and of the second coupling component 32 via a claw connection. Accordingly, the internal toothing 54 on the axial limbs 50 of the intermediate friction rings 42, 43 and the external toothing 58 of the shifting shaft 56 can be dispensed with.

In this case, the second coupling component 32 may be a coupling disc as indicated in FIG. 8, which is fixed for example to a planetary gear set 14 of the stepped transmission 10 and thus to a transmission shaft.

In particular from FIGS. 8 and 10, it is clear that the limb projections 84 of the intermediate friction ring 42 and the portions, located between the recesses 86, of the axial limb 50 of the further intermediate friction ring 43 have a large overlap in the axial direction, in such a way that, in this case too, exact and substantially play-free axial guidance of the two intermediate friction rings 42, 43 is ensured, and undesirable wobbling movement of the intermediate friction rings 42, 43 is prevented.

FIG. 11 to 15 show a further embodiment of the shifting device 26, 28, which basically differs from the embodiment of FIG. 8 to 10 in that the two coupling components 30, 32 can be coupled not only in a frictional fit but also in a positive fit.

Figure 11:
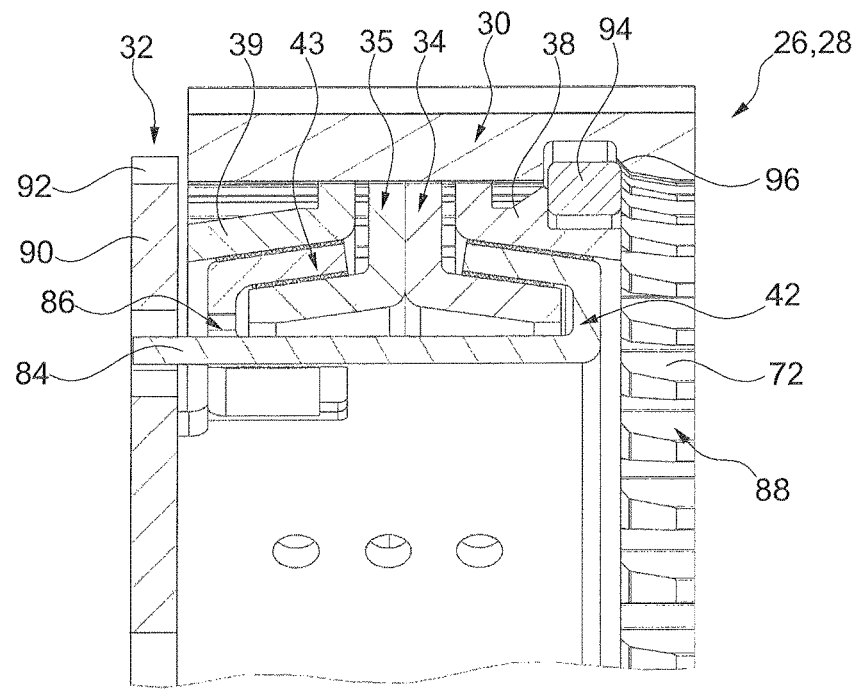
FIG. 11 is a longitudinal sectional detail of the shifting device according to the invention in accordance with a further embodiment.
Figure 12:
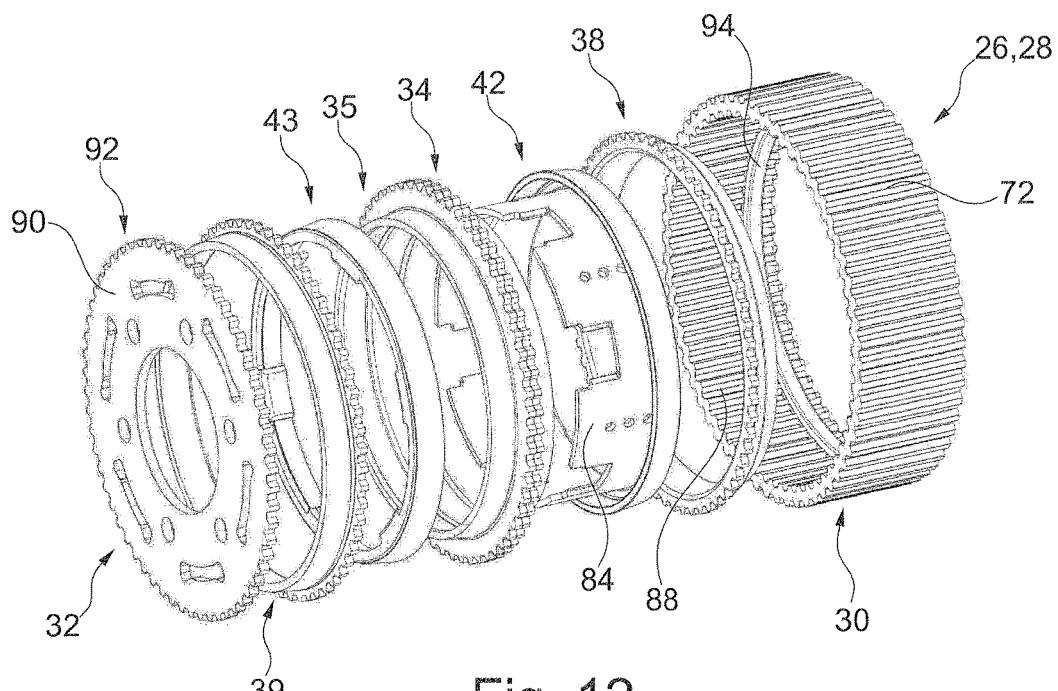
FIG. 12 is a perspective exploded view of the shifting device according to FIG. 11.

In FIGS. 11 and 12, the first coupling component 30 is formed as an axially displaceable actuation sleeve 72 comprising an internal toothing 88 and the second coupling component 32 is formed as a coupling disc 90 comprising an external toothing 92, it being possible for the coupling disc 90 for example to be fixed to a planetary gear set 14 and thus to a transmission shaft of the stepped transmission 10. In this embodiment of the shifting device 26, 28, the two coupling components 30, 32 are decoupled in the rotational direction in an axial starting position of the first coupling component 30 (FIG. 11), are coupled in a frictional fit in the rotational direction in a frictional fit position of the first coupling component 30, and are coupled in a positive fit in the rotational direction via the inner toothing 88 and the outer toothing 92 in a positive fit position of the first coupling component 30.

For axially coupling the first coupling component 30, configured as an actuation sleeve 72, to the outer friction ring 38, a spring element 94 in the form of a radially resilient C ring is provided, and entrains the outer friction ring 38 when the first coupling component 30 is displaced from the starting position towards the positive fit position in a relaxed state of the spring element 94, and is axially decoupled from the actuation sleeve 72 in a tensioned state of the spring element 94.

In FIG. 11, the outer friction ring 38 is axially urged by the actuation sleeve 72 via the spring element 94 until the coupling components 30, 32 are coupled in a frictional fit. If in the frictional fit position the axial force on the actuation sleeve 72 is now further increased, the radial force component applied via an approach bevel 96 of the actuation sleeve 72 becomes so large that the spring element 94 moves radially inwards against the spring force thereof until the actuation sleeve 72 is axially decoupled from the outer friction ring 38 and can be moved further axially towards the coupling disc 90. As a result of this axial movement, the internal toothing 88 of the actuation sleeve 72 ultimately engages in the external toothing 92 of the coupling disc 90, in such a way that the coupling components 30, 32 are coupled in a positive fit in the circumferential direction.

FIG. 13 is a detailed view of the intermediate friction rings 42 intercoupled in the circumferential direction, a coupling location of the intermediate friction rings 42, 43 being shown in detail in FIG. 14.

This makes it clear that the surfaces of the intermediate friction rings 42, 43 which are mutually adjacent in the circumferential direction are chamfered in such a way that the intermediate friction rings 42, 43 are centred in the radial direction and orientated with respect to one another.

FIG. 15 shows the positive fit connection, which is largely play-free in the circumferential direction, between the intermediate friction ring 42 or intermediate friction rings 42, 43 and the second coupling component 32 configured as a coupling disc 90. The limb projections 84 engage in corresponding recesses 100 in the coupling disc 90 in an exact fit in the circumferential direction.

Figure 16:
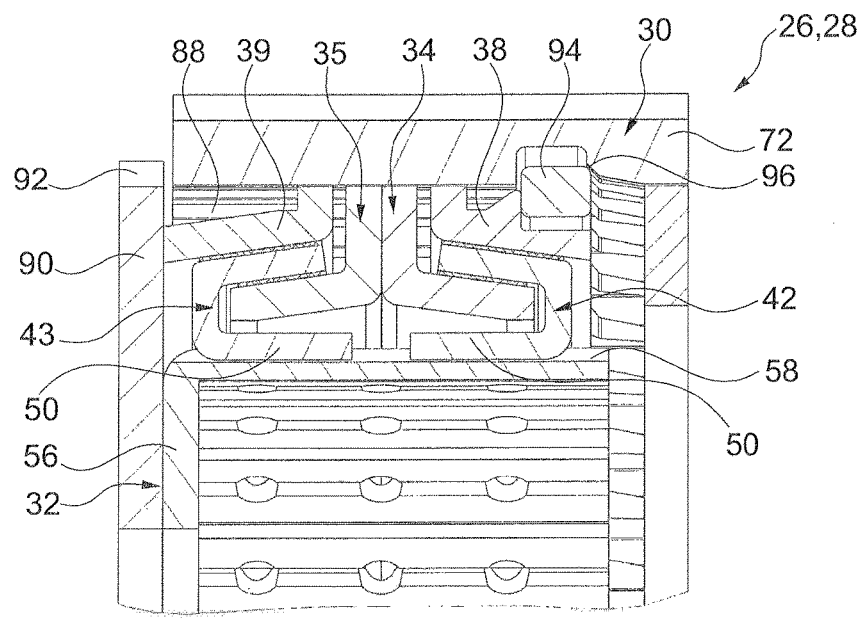
FIG. 16 is a longitudinal sectional detail of the shifting device in accordance with a further embodiment.
Figure 17:
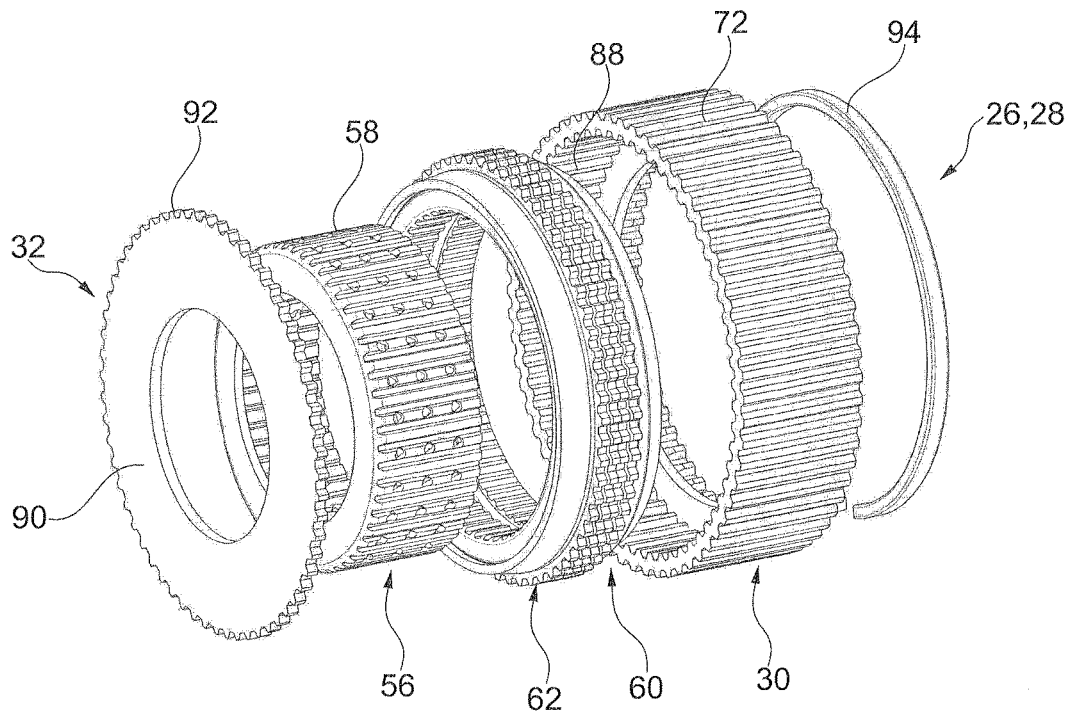
FIG. 17 is a perspective exploded view of the shifting device of FIG. 16.

FIGS. 16 and 17 show a further embodiment of the shifting device 26, 28, which merely differs from the embodiment of FIG. 11 to 15 in that the rotationally engaged connection of the intermediate rings 42, 43 takes place via internally toothed axial limbs 50 of the intermediate friction rings 42, 43 and an externally toothed shifting shaft 56, analogously to FIGS. 4 and 7.

In this case, the shifting shaft 56 is rigidly connected to the coupling disc 90, and together with the coupling disc 90 forms the second coupling component 32.

Figure 18:
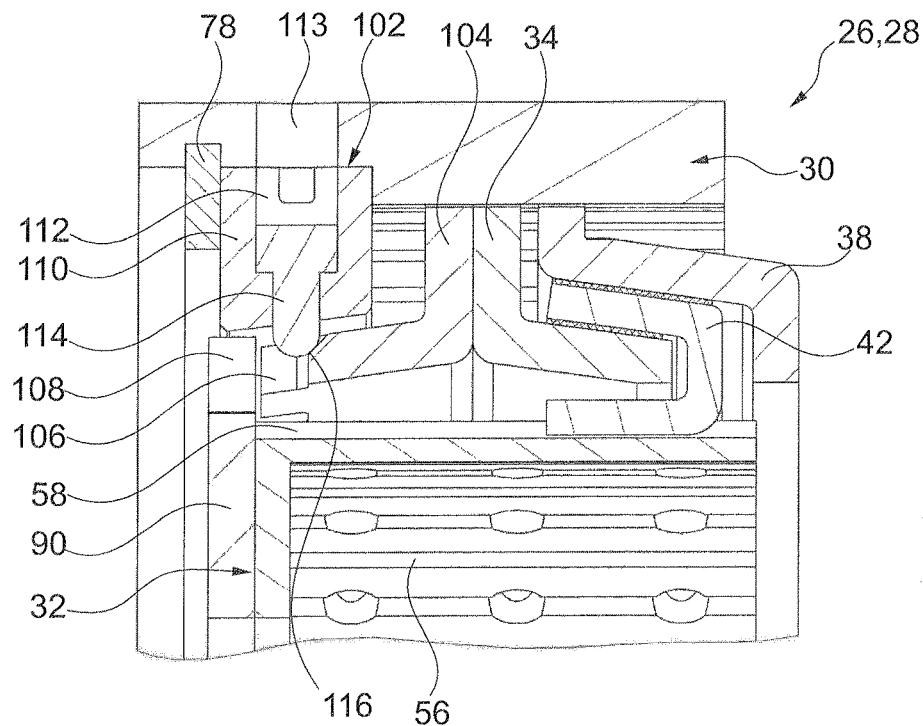
FIG. 18 is a longitudinal sectional detail of the shifting device according to the invention in accordance with a further embodiment.
Figure 19:
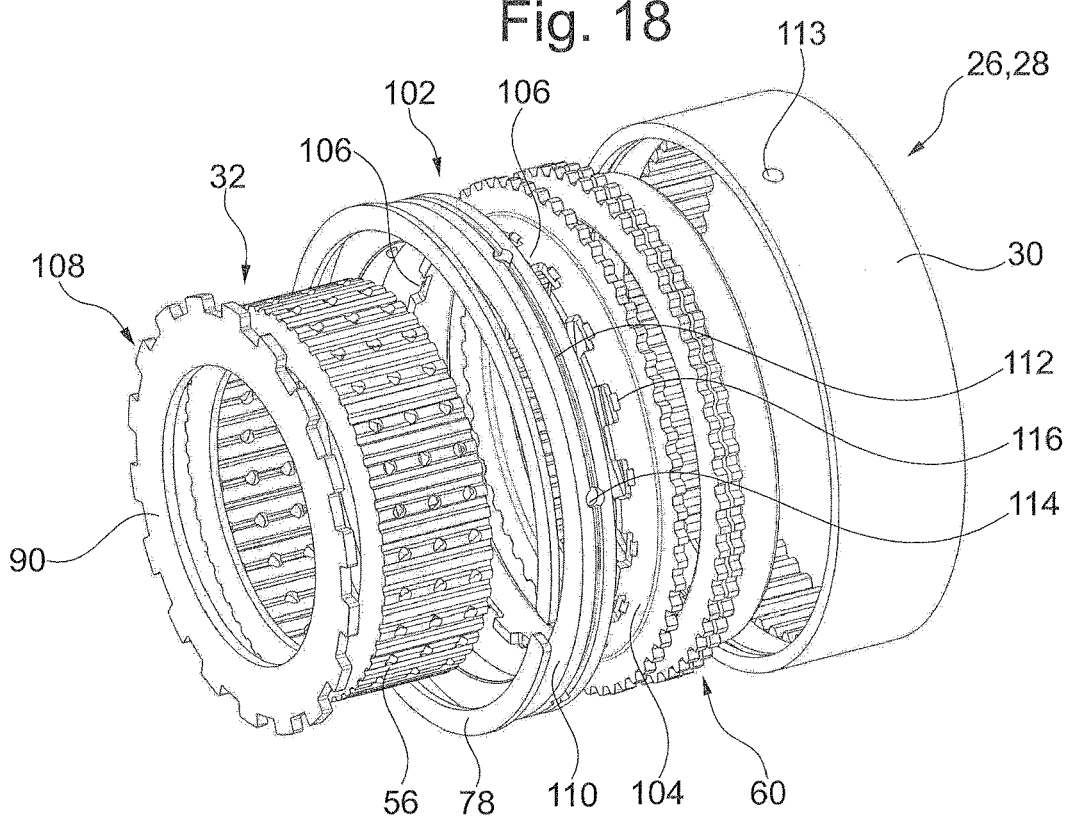
FIG. 19 is a perspective exploded view of the shifting device of FIG. 18.

Finally, FIGS. 18 and 19 show another further embodiment of the shifting device 26, 28, which basically differs from the embodiment of FIGS. 16 and 17 in that a movement of the shifting device 26, 28 between the frictional fit position thereof and the positive fit position thereof takes place by means of a hydraulically actuable actuator unit 102, and not in a power-controlled manner by way of the spring element 94.

In the blocking position thereof (FIG. 18) the actuator unit 102 blocks an axial movement of the outer friction ring 38 from the frictional fit position into the positive fit position, whereas in the release position thereof the actuator unit 102 releases an axial movement of the outer friction ring 38 from the frictional fit position into the positive fit position.

Instead of the second friction ring set 62, in this embodiment a positive fit ring 104 is provided, which is connected to the first coupling component 30 so as to be rotationally engaged and axially displaceable and comprises a claw toothing 106.

The rotationally engaged connection of the intermediate friction ring 42 takes place analogously to FIGS. 4 and 7 by way of the internally toothed axial limb 50 and the externally toothed shifting shaft 56. The shifting shaft 56 is rigidly connected to the coupling disc 90, and together therewith forms the second coupling component 32, the coupling disc 90 comprising a claw toothing 108.

In this embodiment of the shifting device 26, 28, the first coupling component 30 and the second coupling component 32 are decoupled in the rotational direction in an axial starting position of the outer friction ring 38, coupled in a frictional fit in the rotational direction in a frictional fit position of the outer friction ring 38, and coupled in a positive fit in the rotational via the claw toothings 106, 108 in a positive fit position of the outer friction ring 38.

In FIGS. 18 and 19, the actuator unit 102 comprises an actuator ring 110, which is received in the first coupling component 30 and comprises a peripheral oil groove 112, which in the assembled state of the shifting device 26, 28 is substantially tightly sealed by the first coupling component 30 and can be supplied with hydraulic oil via a hole 113 in the first coupling component 30.

The actuator ring 110 comprises radially displaceable blocking pistons 114, which are uniformly distributed in the circumferential direction, and which are urged radially inwards against approach bevels 116 of the positive fit ring 104 and prevent axial displacement of the positive fit ring 104 towards the coupling disc 90 when the oil groove 112 is exerted to pressure. As a result, in addition, the axial movement of the outer friction ring 38 from the frictional fit position thereof into the positive fit position thereof is also prevented.

If the hydraulic pressure in the oil groove 112 decreases, for example after successful rotational speed equalisation, the blocking pistons 114 may be displaced radially outwards over the approach bevels 116 by an axial shifting force acting on the outer friction ring 38. The positive fit ring 104 can subsequently be displaced axially towards the coupling disc 90 until the claw toothings 106, 108 engage in one another, in such a way that the coupling components 30, 32 are coupled in a positive fit in the rotational direction.

The invention claimed is:

1. A shifting device for a motor vehicle transmission, comprising:
    a first coupling component,
    a second coupling component rotatable about a transmission axis (A),
    an inner friction ring which has a conical surface on a radially outer face and is connected to the first coupling component for joint rotation with and for axial displacement with respect to the first coupling component,
    an outer friction ring which has a conical surface on a radial inner face and is connected to the first coupling component for joint rotation with and for axial displacement with respect to the first coupling component, and
    an intermediate friction ring which comprises a friction cone and is connected to the second coupling component for joint rotation with and for axial displacement with respect to the second coupling component,
    the friction cone extending between the conical surface of the inner friction ring and the conical surface of the outer friction ring,
    the first coupling component and the second coupling component being decoupled in the rotation direction in an axial starting position of the outer friction ring and being coupled in a frictional fit in the rotation direction in an axial frictional fit position of the outer friction ring,
    wherein the cross-section of the intermediate friction ring is generally C-shaped extending in the circumferential direction along a complete periphery of the intermediate friction ring, comprising a radially outer linear cone limb which forms the friction cone and comprises two substantially parallel conical friction surfaces, and comprising a radially inner linear axial limb extending parallel to the transmission axis which (1) is integrally connected to the cone limb by a radial web, and which (2) directly contacts the second coupling component.

2. The shifting device according to claim 1, wherein the first coupling component is a transmission housing or an actuation sleeve rotationally engaged with the transmission housing which is rotatable.

3. The shifting device according to claim 1, wherein the first coupling component is a transmission shaft or an actuation sleeve connected to the transmission shaft for joint rotation with and for axial displacement with respect to the transmission shaft.

4. The shifting device according to claim 1, wherein at least one of the inner friction ring and the outer friction ring is a reshaped sheet metal part.

5. The shifting device according to claim 1, wherein the intermediate friction ring is a sheet metal part reshaped to obtain the C-shape in cross section.

6. The shifting device according to claim 1, wherein the axial limb of the intermediate friction ring comprises an internal toothing on the radial inner side, which extends over the entire axial length of the axial limb.

7. The shifting device according to claim 6, wherein the second coupling component is a shifting shaft which has an external toothing engaged with the internal toothing of the intermediate friction ring.

8. The shifting device according to claim 1, wherein a spring element is provided which urges the inner friction ring and the outer friction ring axially into a ventilation position.

9. The shifting device according to claim 1, wherein the inner friction ring, the outer friction ring and the intermediate friction ring form a first friction ring set, and a second friction ring set is provided which comprises a further inner friction ring, a further outer friction ring and a further intermediate friction ring.

10. The shifting device according to claim 9, wherein the first friction ring set and the second friction ring set are arranged mirror-symmetrically, and the transmission axis (A) extends perpendicular to a plane of symmetry (E) of the friction ring sets.

11. The shifting device according to claim 9, wherein the inner friction ring and the further inner friction ring are each configured L-shaped in cross section and each comprise a cone limb and a radial limb extending radially outwards from the cone limb.

12. A shifting device for a motor vehicle transmission comprising:
    a first coupling component,
    a second coupling component rotatable about a transmission axis (A), an inner friction ring which has a conical surface on a radially outer face and is connected to the first coupling component for joint rotation with and for axial displacement with respect to the first coupling component, an outer friction ring which has a conical surface on a radial inner face and is connected to the first coupling component for joint rotation with and for axial displacement with respect to the first coupling component, and an intermediate friction ring which comprises a friction cone and is connected to the second coupling component for joint rotation with and for axial displacement with respect to the second coupling component, the friction cone extending between the conical surface of the inner friction ring and the conical surface of the outer friction ring, the first coupling component and the second coupling component being decoupled in the rotation direction in an axial starting position of the outer friction ring and being coupled in a frictional fit in the rotation direction in an axial frictional fit position of the outer friction ring, wherein the intermediate friction ring has a C-shaped ring cross section extending peripherally in the circumferential direction, comprising a radially outer linear cone limb which forms the friction cone and comprises two substantially parallel conical friction surfaces, and comprising a radially inner linear axial limb which is integrally connected to the cone limb by a radial web, wherein the inner friction ring, the outer friction ring and the intermediate friction ring form a first friction ring set, and a second friction ring set is provided which comprises a further inner friction ring, a further outer friction ring and a further intermediate friction ring, wherein the inner friction ring and the further inner friction ring are each configured L-shaped in cross section and each comprise a cone limb and a radial limb extending radially outwards from the cone limb, and, wherein the radial limbs are axially braced against one another, in such a way that the inner friction ring and the further inner friction ring form an inner lamella T-shaped in cross section.

13. A shifting device for a motor vehicle transmission comprising:

a first coupling component, a second coupling component rotatable about a transmission axis (A), an inner friction ring which has a conical surface on a radially outer face and is connected to the first coupling component for joint rotation with and for axial displacement with respect to the first coupling component, an outer friction ring which has a conical surface on a radial inner face and is connected to the first coupling component for joint rotation with and for axial displacement with respect to the first coupling component, and an intermediate friction ring which comprises a friction cone and is connected to the second coupling component for joint rotation with and for axial displacement with respect to the second coupling component, the friction cone extending between the conical surface of the inner friction ring and the conical surface of the outer friction ring, the first coupling component and the second coupling component being decoupled in the rotation direction in an axial starting position of the outer friction ring and being coupled in a frictional fit in the rotation direction in an axial frictional fit position of the outer friction ring, wherein the intermediate friction ring has a C-shaped ring cross section extending peripherally in the circumferential direction, comprising a radially outer linear cone limb which forms the friction cone and comprises two substantially parallel conical friction surfaces, and comprising a radially inner linear axial limb which is integrally connected to the cone limb by a radial web, wherein the inner friction ring, the outer friction ring and the intermediate friction ring form a first friction ring set, and a second friction ring set is provided which comprises a further inner friction ring, a further outer friction ring and a further intermediate friction ring, wherein the inner friction ring and the further inner friction ring are each configured L-shaped in cross section and each comprise a cone limb and a radial limb extending radially outwards from the cone limb, and, wherein the radial limbs are in surface contact with one another, and the second coupling part is a hollow, perforated shifting shaft for internally oiling the friction surfaces.

14. The shifting device according to claim 11, wherein at least one of the radial limbs comprises spacers, spaced apart in the circumferential direction, for axially spacing apart the inner friction rings, the first coupling component comprising a duct, for externally oiling the friction surfaces, radially outside the spacers.

15. The shifting device according to claim 9, wherein the radially inner axial limb of the intermediate friction ring comprises limb projections spaced apart in the circumferential direction, which extend in the axial direction and engage in recesses of the further intermediate friction ring and of the second coupling component in an exact fit in the circumferential direction.

16. The shifting device according to claim 1, wherein the first coupling component is an axially displaceable actuation sleeve comprising an inner toothing and the second coupling component is a coupling disc comprising an outer toothing, the first coupling component and the second coupling component being decoupled in the rotational direction in an axial starting position of the first coupling component, being coupled in a frictional fit in the rotational direction in a frictional fit position of the first coupling component, and being coupled in a positive fit in the rotational direction via the inner toothing and the outer toothing in a positive fit position of the first coupling component.

17. The shifting device according to claim 16, wherein a spring element is provided for axially coupling the actuation sleeve to the outer friction ring, the spring element entraining the outer friction ring when the actuation sleeve is displaced from the starting position towards the positive fit position in a relaxed state of the spring element, and being axially decoupled from the actuation sleeve in a tensioned state of the spring element.

18. The shifting device according to claim 1, wherein a positive fit ring is provided, which is connected to the first coupling component for joint rotation with and for axial displacement with respect to the first coupling component, and has a claw toothing, the second coupling component being a coupling disc having a claw toothing, the coupling components being decoupled in the rotational direction in an axial starting position of the outer friction ring, being coupled in a frictional fit in the rotational direction in an axial frictional fit position of the outer friction ring, and being coupled in a positive fit in the rotational direction via the claw toothings in an axial positive fit position of the outer friction ring, an actuator unit being provided which in a blocking position blocks an axial movement of the outer friction ring from the frictional fit position into the positive fit position and in a release position releases an axial movement of the outer friction ring from the frictional fit position into the positive fit position.

19. The shifting device according to claim 10, wherein the inner friction ring and the further inner friction ring are each configured L-shaped in cross section and each comprise a cone limb and a radial limb extending radially outwards from the cone limb.

20. The shifting device according to claim 12, wherein the radial limbs are in surface contact with one another, and the second coupling part is a hollow, perforated shifting shaft for internally oiling the friction surfaces.

21. The shifting device according to claim 12, wherein at least one of the radial limbs comprises spacers, spaced apart in the circumferential direction, for axially spacing apart the inner friction rings, the first coupling component comprising a duct, for externally oiling the friction surfaces, radially outside the spacers.

22. The shifting device according to claim 1, wherein the axial limb of the intermediate friction ring extends linearly from a radial web of the intermediate friction ring in the axial direction to a free axial end, at which no radially inwardly protruding projections are provided.

* * * * *